United States Patent
Kunz et al.

(10) Patent No.: US 10,026,973 B2
(45) Date of Patent: Jul. 17, 2018

(54) METALLIC PLATE WITH AT LEAST ONE MEASURING STRUCTURE AND METHOD OF PRODUCING A METALLIC PLATE WITH AT LEAST ONE MEASURING STRUCTURE

(71) Applicant: REINZ-Dichtungs-GmbH, Neu-Ulm (DE)

(72) Inventors: Claudia Kunz, Ulm (DE); Bernd Gaugler, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 233 days.

(21) Appl. No.: 15/147,214

(22) Filed: May 5, 2016

(65) Prior Publication Data

US 2016/0351921 A1    Dec. 1, 2016

(30) Foreign Application Priority Data

May 28, 2015    (DE) .................... 20 2015 102 771

(51) Int. Cl.
| | |
|---|---|
| *H01M 8/0297* | (2016.01) |
| *H01M 8/021* | (2016.01) |
| *C25B 13/04* | (2006.01) |
| *B21D 35/00* | (2006.01) |
| *H01M 8/0258* | (2016.01) |
| *H01M 8/04313* | (2016.01) |
| *G01B 11/00* | (2006.01) |

(52) U.S. Cl.
CPC ........ *H01M 8/0297* (2013.01); *B21D 35/001* (2013.01); *C25B 13/04* (2013.01); *G01B 11/002* (2013.01); *H01M 8/021* (2013.01); *H01M 8/0258* (2013.01); *H01M 8/04313* (2013.01)

(58) Field of Classification Search
CPC ..... B21D 35/001; C25B 13/04; G01B 11/002; H01M 8/021; H01M 8/0202; H01M 8/0204; H01M 8/0206; H01M 8/0208; H01M 8/0258; H01M 8/0297; H01M 8/04313

See application file for complete search history.

(56) References Cited

U.S. PATENT DOCUMENTS

| | | | |
|---|---|---|---|
| 3,853,626 | A | 12/1974 | Daniels, Jr. et al. |
| 3,867,200 | A | 2/1975 | Daniels, Jr. |
| 3,890,160 | A | 6/1975 | Daniels, Jr. |
| 2012/0198714 | A1 | 8/2012 | Keyser et al. |

FOREIGN PATENT DOCUMENTS

| | | |
|---|---|---|
| DE | 2444859 A1 | 4/1975 |
| DE | 3536374 A1 | 4/1987 |
| DE | 102012002053 A1 | 8/2012 |

*Primary Examiner* — Carlos Barcena
(74) *Attorney, Agent, or Firm* — Marshall & Melhorn, LLC

(57) ABSTRACT

A metallic plate for an electrochemical system is provided. The plate has at least one measuring structure formed in one piece with the plate. The measuring structure has at least two cuts through the plate and a first deformation of the plate arranged between the cuts. The cut edges are spaced apart from one another in sections by the first deformation so that the cut edges form at least two windows in the plate. The measuring structure has at least a second deformation of the plate. The plate is deformed by the second deformation in the region of the plate adjacent to the windows in such a manner that the windows allow light that falls on the plate orthogonally to the main plane of the plate to pass through. As described is a method of producing a metallic plate including at least one measuring structure.

28 Claims, 6 Drawing Sheets

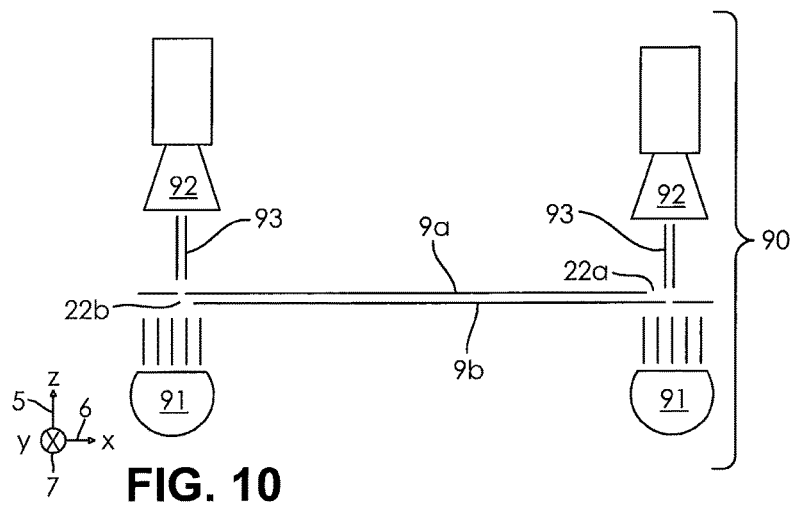
FIG. 10
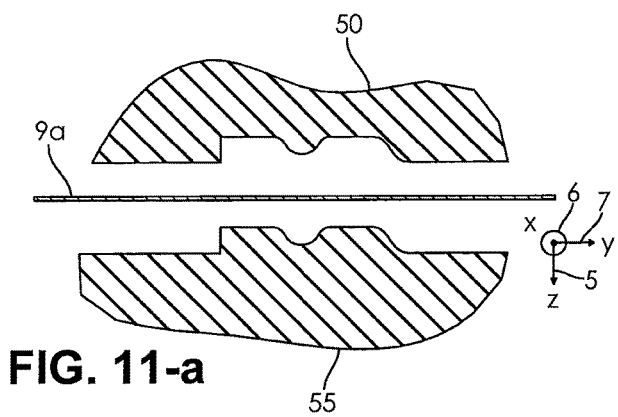
FIG. 11-a
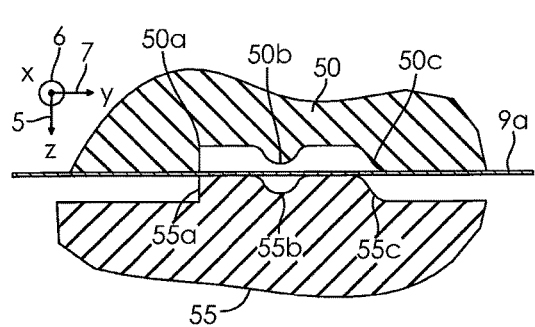
FIG. 11-b
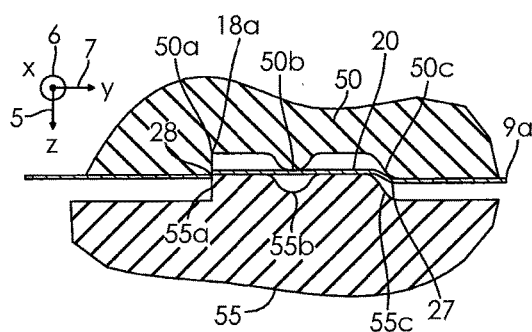
FIG. 11-c

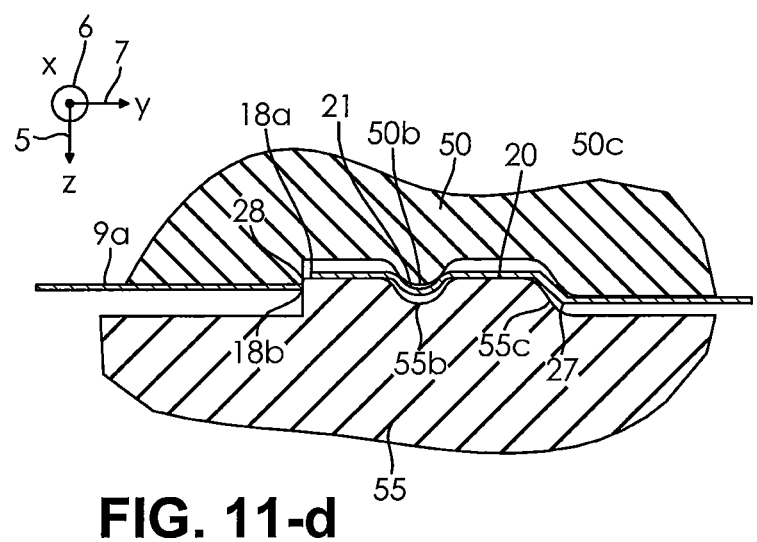
FIG. 11-d

METALLIC PLATE WITH AT LEAST ONE MEASURING STRUCTURE AND METHOD OF PRODUCING A METALLIC PLATE WITH AT LEAST ONE MEASURING STRUCTURE

FIELD OF THE INVENTION

The invention relates to a metallic plate for an electrochemical system wherein the metallic plate comprises at least one measuring structure. The invention further relates to a method of producing a metallic plate including at least one measuring structure.

BACKGROUND OF THE INVENTION

Known electrochemical systems, for example fuel cell systems or electrochemical compressor systems such as electrolyzers, usually comprise a stack of electrochemical cells separated from each other by metallic bipolar plates. Said bipolar plates usually comprise two individual metallic plates that are typically welded to each other and are normally made of thin metal sheets. The bipolar plates, or the individual plates making up the bipolar plates, may serve, for example, to electrically contact the electrodes of the individual electrochemical cells (e.g., fuel cells) and/or to electrically connect adjacent cells (serial connection of the cells).

The bipolar plates, or the individual plates making up the bipolar plates, may comprise a channel structure adapted for supplying the cells with one or more media and/or for removing reaction products. The media may, for example, be fuels (e.g., hydrogen or methanol), reaction gases (e.g., air or oxygen) or coolants. Such a channel structure is usually arranged in an electrochemically active region (gas distribution structure/flowfield). Furthermore, the bipolar plates, or the individual plates making up the bipolar plates, may be adapted for passing on waste heat generated during conversion of electrical or chemical energy in the electrochemical cell and for sealing the individual media or coolant channels from each other and/or from the outside. The aforementioned channel structures and/or sealing structures, in particular sealing beads, are usually stamped into the individual plates by means of a stamping tool. Similar structures also exist in separator plates used in humidifiers of electrochemical systems. What is said in the following regarding bipolar plates and their individual plates accordingly also applies to separator plates in humidifiers.

It is known to provide each of the individual plates, or of the bipolar plates, with one or more measuring structures. These are structures formed at or on the plates that are detectable by an optical sensor and are used, by utilizing a pattern or image recognition software, to establish a coordinate system oriented in a defined manner relative to the plate. Said coordinate system helps, for example, in measuring the plate, in automatically positioning the plate in a tool, or in measuring structures stamped into the plate or applied to the plate. The tool in which the plate is positionable in a defined manner by means of the measuring structures may be, for example, a joining tool, a coating device, or a cutting device, in particular a die cutting or laser cutting device. Multiple process steps may be performed in a defined position by virtue of measuring relatively to such a measuring structure, e.g., positioning of the laser welding seams, positioning of screen printing for partial coating, etc.

A measuring structure according to this kind is known, for example, from the document DE 102012002053A1, termed a measuring feature (Messmerkmal) there. In a particular embodiment, the measuring feature according to DE 102012002053A1 is a basically circular cavity arranged in an elevated section on the plate. Such rounded cavities can be easily localized, and their center points determined, with known optical measuring systems.

An optical measuring system for localizing said measuring structure comprises, for example, a light source for illuminating the measuring structure and an image detector for capturing an image of the plate with the measuring structure arranged on the plate, wherein the light source and the camera are arranged on the same side of the plate (reflected-light method). The accuracy with which the measuring structures are localizable when the images are captured using the reflected-light method, however, may be impaired to a high degree by the lighting conditions, by the optical properties of the material of the plate surface, or by the optical properties of a coating on the plate surface and/or by the geometrical characteristics of the plate surface.

Transmitted-light methods are more robust methods for localizing measuring structures. With transmitted-light methods, the measuring structure comprises at least one through-hole, and the light source and the image detector are arranged on different sides of the plate so that the light emitted by the light source typically passes through the through-hole orthogonally to the main plane of the plate and is detected by the image detector on the opposite side of the plate. In the transmitted-light method, the image of the measuring structure thus can normally be captured with improved contrast as compared to the reflected-light method. However, in order to form measuring structures having a through-hole, to date the through-hole has to be punched in an additional manufacturing step. On the other hand, if the through-hole is punched during the stamping process, additional punching waste is created in the stamping tool. The punching slugs produced in the process may permanently damage the stamping tools.

If a measuring structure is formed in a process step other than the one in which the remaining stamped structures are formed, an offset may occur between these two types of structure that impedes a reliable positioning or even makes it impossible.

It is thus the object of the present invention to create a metallic plate having at least one measuring structure which plate is suitable for being used in an electrochemical system, the plate being manufacturable in as simple and cost-effective a manner as possible and permitting localization of the measuring structure in as simple a way as possible and with as high an accuracy as possible, particularly relative to the other structures of the plate.

SUMMARY

Thus, what is proposed is a metallic plate for an electrochemical system. The plate comprises at least one measuring structure formed in one piece with the plate. The measuring structure comprises at least two cuts through the plate and a first deformation of the plate arranged between the cuts and delimited in sections by the cuts, so that the cut edges of the cuts, spaced apart from one another in sections by the first deformation, form at least two windows in the plate. The measuring structure further comprises at least a second deformation of the plate, wherein the plate is deformed by the second deformation in the region of the plate adjacent to the windows in such a way that the windows allow light that falls on the plate orthogonally to the main plane of the plate to pass through.

Since the windows are formed by cuts through the plate and by the first and the second deformation of the plate, no punching waste is produced when the windows are formed. This means that cutting the plate to form the cuts in particular does not involve chipping and is thus not associated with a removal of material. The measuring structure may thus be formed when the plate is stamped in the stamping tool. This decreases the number of steps needed to manufacture the plate and the measuring structure.

By forming the windows in such a way that they allow light falling on the plate orthogonally to the main plane of the plate to pass through, the measuring structure can be localized by the transmitted-light method. This permits localization to be performed with very high accuracy, and largely independently of the lighting conditions and the surface conditions of the metallic plate. In particular, the windows are formed in such a manner that for each window the cut edges of the plate forming the window edges and reaching up to the window in sections are spaced apart from one another parallel to the main plane of the plate. Along the course of a cut, the cut edges usually move apart from each other and then approach each other again. Thus, the windows form through-holes in the plate, the projection of the through-holes onto a plane parallel to the main plane of the plate having an area other than zero and through which through-holes light falling vertically onto the plate can pass through the window. When an image of the measuring structure is captured via the transmitted-light method, the edges of the plate forming the edges of the window create an especially sharp contrast, which permits particularly good localization of the measuring structure.

The cuts and other elements of the measuring structure may be particularly be formed when stamping the plate so that their positioning relative to the stamping structures always remains the same. Many punching or cutting structures are frequently formed in later manufacturing steps at a defined position relative to said measuring structures.

The metallic plate may in particular be an individual plate or a bipolar plate for an electrochemical system comprising two joined individual plates, as is described above. For example, the metallic plate may comprise stainless steel or be formed from stainless steel. The metallic plate can additionally be coated, at least in regions. For a thickness D determined orthogonally to the main plane of the plate, the following may hold: 50 µm≤D≤150 µm, preferably 65 µm≤D≤100 µm.

The first deformation may form a region that is elevated relative to the main plane of the plate. The elevated region may be elevated throughout relative to the main plane of the plate, that is to say, it may be spaced apart throughout from the main plane of the plate. The height H of the elevated region, determined orthogonally to the main plane of the plate, may vary along the elevated region or within the elevated region. In particular, the elevated region may be formed or may have been formed, for example in a stamping tool, by a deforming force acting on the plate orthogonally to the main plane of the plate.

For a maximal height H of the elevated region being determined along a first direction orthogonal to the main plane of the plate and being determined from the level of the main plane of the plate, the following may hold: 100 µm≤H≤700 µm, preferably 200 µm≤H≤400 µm, particularly preferably 250 µm≤H≤350 µm. In relation to the thickness D of the plate, the following may thus hold for the maximal height H of the elevated region: D≤H≤10 D, preferably 2 D≤H≤6 D, particularly preferably 2.5 D≤H≤5 D. For an area F of the elevated region, the following may hold: 0.5 mm²≤F≤50 mm², preferably 2 mm²≤F≤20 mm².

The second deformation causes the actual opening of the window area transverse to the direction of light transmission and thus, for example, parallel to the main plane of the plate, so that the second deformation enables light to pass through the windows of the measuring structure. The second deformation, or at least one of the second deformations, may be spaced apart from the windows, namely preferably along a direction parallel to the main plane of the plate and orthogonal, or essentially orthogonal, to the longitudinal direction of the cut forming the window in question or to the edges of the plate delimiting the window in question. That means that here the second deformation or the second deformations preferably do not consist of a mere bending of the edges reaching up to the window. The second deformation, too, may be a deformation of the plate that is orthogonal to the main plane of the plate, or comprise a deformation that is orthogonal to the main plane of the plate. In other words, also the second deformation of the plate may be formed, or may have been formed, by a deforming force acting on the plate orthogonally to the main plane of the plate, for example in a stamping tool. When the measuring structure is formed, the material of the plate in the region of the plate adjacent to the windows is typically pulled, due to the second deformation, toward the second deformation, which is spaced apart from the windows. During that process, the window is opened transverse to the direction of light transmission, and thus, for example parallel to the main plane of the plate. This has the result that for every window the edges of the plate that form the edge of the window are spaced apart, at least in regions, parallel to the main plane of the plate, as is described above.

The second deformation, or at least one of the second deformations, may be formed within the elevated region formed by the first deformation. That means that in this case the second deformation is typically given in the form of a modulation of the height H of the elevated region. Alternatively or additionally, the second deformation, or at least one of the second deformations, may also be formed outside the elevated region formed by the first deformation.

For example, the second deformation of the plate, or at least one of the second deformations of the plate, may form a curve enclosing the first deformation, preferably a closed one, particularly in the shape of a ditch forming a closed loop. For instance, the second deformation may in this case be formed as an annular ditch enclosing the first deformation or the elevated region, or may be formed as a bead enclosing the first deformation or the elevated region.

The plate may be deformed by the first deformation in a direction orthogonal to the main plane of the plate. In other words, the first deformation may comprise a deformation of the plate orthogonal to the main plane of the plate. The plate may then be deformed in a second direction opposite to the first direction and orthogonal to the main plane of the plate by the second deformation or at least one of the second deformations. In other words, the second deformation may comprise a deformation of the plate orthogonal to the main plane of the plate. In principle, it is conceivable just as well that the plate is deformed in the same direction orthogonal to the main plane of the plate by the first deformation and by the second deformation. In other words, the first and the second deformation may each comprise a deformation of the plate in the same direction orthogonal to the main plane of the plate. This is in particular possible if the second deformation is made outside the area covered by the first deformation.

The measuring structure is localizable in an especially easy manner with especially good accuracy if the cuts or the windows are arranged symmetrically to each other. For example, the window-forming cuts of the same measuring structure may be of the same length, at least pair-wise. Also, all cuts of the same measuring structure may be of the same length.

In a specific embodiment the measuring structure may comprise, for example, two cuts of the same length that are oriented parallel to each other and lie opposite each other, i.e., coincide when seen along a direction orthogonal to the longitudinal direction of the cuts. Between the two cuts, two webs of material normally remain.

In a further embodiment the measuring structure may comprise three or more cuts, which preferably all have the same length. The cuts as such, prior to any further deformation, may then be arranged in such a manner that all their outer and all their inner cut edges form arcs lying on a common circle. Once the first and second deformation have taken place, either all their outer or all their inner cut edges form arcs lying on a common circle. Here, the outer cut edges typically mean those cut edges that delimit the windows toward the main plane of the plate. In contrast, the inner cut edges typically mean those cut edges that delimit the windows toward the first deformation, for example toward the elevated region of the measuring structure formed by the first deformation. Between each of two adjacent arcs, some material is left forming webs that connect the elevated region, which is formed by the first deformation inside the circle, to the region of the plate enclosing the elevated region. If n is the number of cuts, or the number of windows of the measuring structure, the arc-like cuts, or window edges, may be formed and arranged so as to exhibit an n-fold symmetry with regard to rotation about the center of the circle. This means that the measuring structure can be made to coincide with itself by rotating with respect to an axis of symmetry of the measuring structure by an angle $\alpha = 2\pi/n$ (radian measure), wherein n is a natural number with $n \geq 2$. The axis of symmetry of the measuring structure is typically oriented orthogonally to the main plane of the plate.

The window-delimiting inner or outer cut edges of the plate may thus be arranged so as to form sections of a closed curve in the main plane of the plate, wherein the closed curve preferably is a circle, an ellipsis or a regular polygon. The inner cut edges are sections of a closed curve preferably if the condition is met that all of the at least one second deformations are formed outside the elevated region formed by the first deformation.

In order to achieve defined, in particular circular, lines, the second deformation is preferably formed either exclusively inside the elevated region formed by the first deformation or exclusively outside the elevated region formed by the first deformation.

For a length L of the cuts, or of the cut edges delimiting the windows, the following may hold: $0.2 \text{ mm} \leq L \leq 10 \text{ mm}$, preferably $0.5 \text{ mm} \leq L \leq 3 \text{ mm}$. With regard to the thickness D of the metallic plate, the following may hold for the length L: $2\,D \leq L \leq 140\,D$, preferably $5\,D \leq L \leq 40\,D$. For an area A of the projection of each of the windows onto a plane parallel to the main plane of the plate, the following may hold: $0.01 \text{ mm}^2 \leq A \leq 5 \text{ mm}^2$, preferably $0.03 \text{ mm}^2 \leq A \leq 2 \text{ mm}^2$.

The metallic plate may comprise a first sealing bead and/or sealing weld forming a closed curve at or on the plate surface. The sealing bead and/or sealing weld runs/run along the outer edge of the plate and spaced apart from the outer edge of the plate and serves/serve as a structure/as structures sealing the plate from the outside. In most applications, further sealing beads and/or sealing welds exist around individual openings, but are of lesser importance with regard to positioning of the measuring structure. The measuring structure may be arranged outside the closed curve formed by the first sealing weld and/or the sealing bead. Alternatively or additionally, the measuring structure may be arranged inside the closed curve formed by the first sealing weld and/or the sealing bead. In that case, the measuring structure is preferably arranged inside a second sealing weld and/or sealing bead, which likewise forms a closed curve, the second sealing weld and/or sealing bead being fully enclosed by the first sealing weld and/or sealing bead. This means that the measuring structure is then separated, like an island, by the second sealing weld and/or sealing bead from the region of the metallic plate enclosed by the first sealing weld and/or sealing bead.

The metallic plate may comprise a plurality of measuring structures of the type described above, for example two, three, four, or more. For example, the plate may comprise four measuring structures of the type described above, being arranged at or on the plate in such a manner that they form the corners of a rectangle. Especially three or four measuring structures will enable a complete measuring and/or positioning of the whole plate. However, a higher number of measuring structures may also be envisaged.

The present invention further relates to a metallic bipolar plate for an electrochemical system, wherein the bipolar plate comprises a first metallic plate of the type described above and a second metallic plate joined to the first metallic plate. Typically, the first and the second metallic plate are welded to each other in regions. The second plate and the first plate may be made from metal sheets of the same type. In particular, both may be made of the same material and have an identical thickness.

The second plate then preferably comprises at least one cutout or hole, for example in the shape of a through-hole, for example a punching hole, and/or in the shape of an indentation in the edge of the second plate. The measuring structure of the first plate and the hole in the second plate are then preferably formed and arranged relative to each other in such a manner that the bipolar plate allows light falling on the bipolar plate orthogonally to the main plane of the bipolar plate to pass through. This means that the windows of the measuring structure of the first plate are then arranged adjacent to the hole in the second plate in such a manner that light falling orthogonally on the main plane of the plate in the region of the windows can pass through the bipolar plate via the windows of the first plate and the hole in the second plate. This allows for measuring of the bipolar plate by a transmitted-light method.

A further development of this embodiment allows providing measuring structures in both individual plates of the bipolar plate. To this end, in at least a first region of the bipolar plate assembled from the two individual plates, the first individual plate comprises a measuring structure as described above and the second individual plate comprises a hole as described above that leaves the measuring structure of the first individual plate visible. In at least a second region of the bipolar plate assembled from the two individual plates, the second individual plate comprises a measuring structure as described above and the first individual plate comprises a hole as described above that leaves the measuring structure of the second individual plate visible. This allows measuring both individual plates of the bipolar plate as well as the bipolar plate by a transmitted-light method.

The invention further relates to a measuring apparatus for localizing a measuring structure in a transmitted-light process. The measuring apparatus comprises:
- a metallic plate or a metallic bipolar plate of the type described above;
- a light source; and
- an optical detector, in particular an image detector;
- wherein the light source and the optical detector are arranged on opposite sides of the plate and separated by the plate; and
- wherein the optical detector is arranged and adapted so as to detect light emitted by the light source and passing through the plate via the windows of the measuring structure.

The light source may comprise, for example, a white-light source. The optical detector may comprise, for example, a camera. The optical detector may be adapted to record image data. Typically, the measuring structure also comprises an evaluation unit connectable to the optical detector and adapted to determine positions of one or more measuring structures of the plate based on the image data. The evaluation unit may also be adapted to define a coordinate system that is fixed relative to the plate based on the positions of the measuring structures.

Furthermore, a method of manufacturing the above-described metallic plate having a measuring structure is presently proposed, i.e., in particular a method of forming the measuring structure in the metallic plate. According to a first aspect, such a method of manufacturing the metallic plate as described above may comprise, for example, at least the following steps:
- making at least two cuts through the metallic plate;
- forming a first deformation of the metallic plate between the cuts through the plate, wherein the cuts are made through the plate and the first deformation is formed in such a manner that the first deformation is delimited at least in regions by the cuts or by the cut edges of the cuts, and that the cut edges of one cut together form one window in the plate; and
- forming at least a second deformation of the metallic plate in the region of the plate adjacent to the windows or in regions of the plate adjacent to the windows, wherein the second deformation is formed in such a manner that the plate is deformed in the region adjacent to the window or in the regions adjacent to the windows in such a way that the windows allow light falling on the plate orthogonally to the main plane of the plate to pass through.

The method steps described above and below may also be executed in a sequence that is different from the sequence described here.

According to a second aspect of the method, which for example includes at least the steps of the first aspect, the first deformation may be formed in such a manner that a region that is elevated relative to the main plane of the plate is formed by the first deformation.

According to a third aspect of the method, which for example includes at least the steps of the second aspect, the first deformation may be formed in such a manner that the elevated region is elevated throughout relative to the main plane of the plate.

According to a fourth aspect of the method, which for example includes at least the steps of one of the preceding aspects, the second deformation or at least one of the second deformations may be formed in such a manner that the second deformation is spaced apart from the windows.

According to a fifth aspect of the method, which for example includes at least the steps of one of aspects 2 to 4, the second deformation or at least one of the second deformations may be formed within the elevated region formed by the first deformation.

According to a sixth aspect of the method, which for example includes at least the steps of one of aspects 2 to 4, the second deformation or at least one of the second deformations may be formed outside the elevated region formed by the first deformation.

According to a seventh aspect of the method, which for example includes at least the steps of one of the preceding aspects, the second deformation of the plate or at least one of the second deformations of the plate may be formed in such a manner that the second deformation forms a curve enclosing the first deformation, in particular in the shape of a ditch forming a closed loop enclosing the first deformation. The closed curve may be, for example, annular.

According to an eighth aspect of the method, which for example includes at least the steps of one of the preceding aspects, the first deformation may be formed in such a manner that the plate is deformed by the first deformation in a first direction that is orthogonal to the main plane of the plate. Alternatively or additionally, the second deformation may be formed in such a manner that the plate is deformed by the second deformation or by at least one of the second deformations in a second direction that is orthogonal to the main plane of the plate and opposite to the first direction.

According to a ninth aspect of the method, which for example includes at least the steps of one of the preceding aspects, the cuts may be made in the plate or the windows be formed in such a manner that the windows are arranged symmetrically relative to each other.

According to a tenth aspect of the method, which for example includes at least the steps of one of the preceding aspects, the cuts may be made in the plate and the windows be formed in such a manner that the inner cut edges of the plate delimiting the windows from the first deformation or the outer cut edges of the plate delimiting the windows from the main plane of the plate are arranged in such a manner that they form sections of a closed curve in the main plane of the plate, wherein the closed curve preferably is a circle, an ellipsis, or a regular polygon.

According to an eleventh aspect of the method, which for example includes at least the steps of one of the preceding aspects, the cut edges may be made in the plate in such a manner that the following holds for a length L of the cut edges: $0.2\text{ mm} \leq L \leq 10\text{ mm}$, preferably $0.5\text{ mm} \leq L \leq 3\text{ mm}$.

According to a twelfth aspect of the method, which for example includes at least the steps of one of aspects 2 to 11, the elevated region formed by the first deformation may be formed in such a manner that the following holds for an area F of the elevated region: $0.5\text{ mm}^2 \leq F \leq 50\text{ mm}^2$, preferably $2\text{ mm}^2 \leq F \leq 20\text{ mm}^2$.

According to a thirteenth aspect of the method, which for example includes at least the steps of one of aspects 2 to 12, the elevated region formed by the first deformation may be formed in such a manner that for a maximal height H of the elevated region, the maximal height H being determined along a first direction orthogonal to the main plane of the plate and being determined from the level of the main plane of the plate, the following holds: $100\text{ μm} \leq H \leq 700\text{ μm}$, preferably $200\text{ μm} \leq H \leq 400\text{ μm}$, in particular $250\text{ μm} \leq H \leq 350\text{ μm}$.

According to a fourteenth aspect of the method, which for example includes at least the steps of one of the preceding aspects, the windows or at least one of the windows may be formed in such a manner that a projection of the window or of each of the windows onto the main plane of the plate has an area A, wherein the following holds: $0.01\ mm^2 \leq A \leq 5\ mm^2$, preferably $0.03\ mm^2 \leq A \leq 2\ mm^2$.

According to a fifteenth aspect of the method, which for example includes at least the steps of one of the preceding aspects, a sealing weld and/or a sealing bead forming a closed curve may be formed at or on the plate, wherein the measuring structure is formed in the plate in such a manner that the measuring structure is arranged outside the closed curve formed by the sealing weld and/or the sealing bead.

According to a sixteenth aspect of the method, which for example includes at least the steps of one of the preceding aspects, four measuring structures may be formed in the plate, and this may be done in such a manner that they form the corners of a rectangle.

According to a seventeenth aspect of the method, which for example includes at least the steps of one of the preceding aspects, the making of the cuts and the forming of the first and/or the second deformation may be performed by a combined cutting/stamping tool, preferably in a single tool stroke.

According to an eighteenth aspect of the method, a metallic bipolar plate or a separator plate for an electrochemical system may be formed. To this end, a first metallic plate according to one of the preceding aspects may be manufactured and joined to a second metallic plate. A through-hole may be made in the second metallic plate, in particular a punched hole. Alternatively or additionally, an indentation may be formed at the outer edge of the second metallic plate. The through-hole or the indentation may be made in the second metallic plate in such a manner, or may be formed in such a manner, and/or the first and the second plate may be joined in such a manner that the edges of the through-hole or of the indentation are offset outwardly relative to the edges of the windows of the measuring structure of the first metallic plate so that the bipolar plate, or separator plate, allows light falling on the bipolar plate or separator plate orthogonally to the main plane of the bipolar plate or separator plate to pass through in the region of the windows of the first metallic plate.

DESCRIPTION OF THE FIGURES

Embodiments of the invention are shown in the drawings and are explained in more detail in the following description. In these embodiments, identical or similar elements are denoted with identical or similar reference numbers, so that their explanation in part is not repeated. With the following embodiments, a plurality of advantageous characteristics of the present invention is given in different combinations. These individual characteristics can however also improve the invention separately, thus without combination with the remaining characteristics of the respective embodiment. There is shown in:

FIG. 10 a measuring apparatus according to the invention;

FIG. 11a is a partial view of an initial manufacturing step of a measuring structure of a bipolar plate according to the invention;

FIG. 11b is a partial view of a manufacturing step subsequent to the step depicted in FIG. 11a;

FIG. 11c is a partial view of a manufacturing step subsequent to the step depicted in FIG. 11b; and FIG. 11d is a partial view of a manufacturing step subsequent to the step depicted in FIG. 11c.

FIG. 1 shows an electrochemical system 1, which for example consists of hydrogen fuel cells electrically connected in series. In alternative embodiments the system 1 may also be, for example, an electrochemical compressor or an electrolyzer. These do not differ in their constructional design, but in particular with respect to the fluids supplied to or discharged from the membrane-electrode assembly (MEA) and with regard to generation or supply, respectively, of electrical energy. Comparable designs are also met with in humidifiers for electrochemical systems, where, however, separator plates take the place of bipolar plates and a water exchanging membrane is used instead of a membrane electrode assembly.

Figure 1:
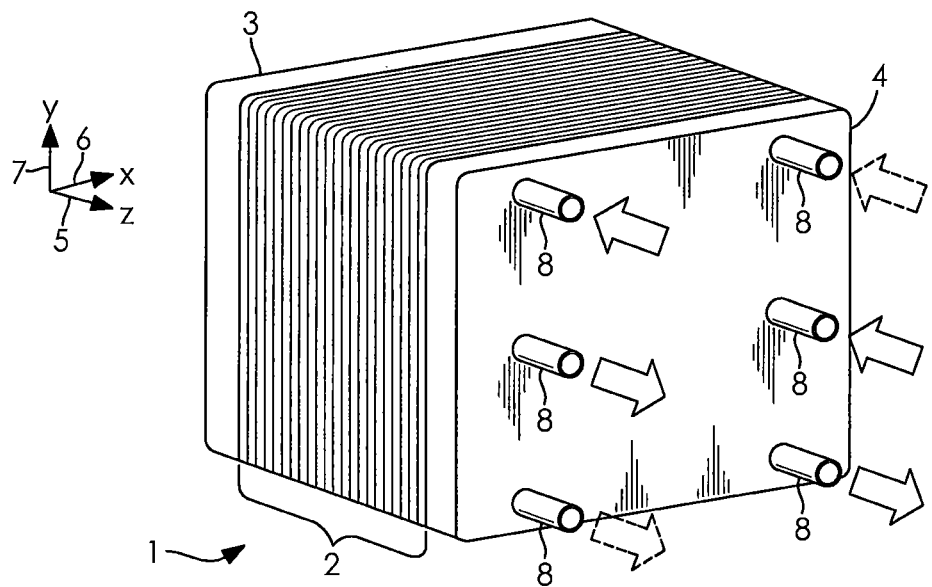
FIG. 1 an electrochemical system having a stack of metallic bipolar plates.

The electrochemical system 1 comprises a stack 2 having a plurality of metallic bipolar plates and having electrochemical cells for converting chemical energy to electrical energy, each arranged between adjacent bipolar plates. The electrochemical cells are electrically connected in series. The bipolar plates and the cells of the stack 2 are stacked along a Z-direction 5 and arranged between two end plates 3 and 4. In conjunction with the Z-direction 5, an X-direction 6 and a Y-direction 7 form a right-handed Cartesian coordinate system. Plate planes of the bipolar plates of the stack 2 are each oriented parallel to the X-Y-plane. Along the Z-direction 5, the bipolar plates and the cells of the stack 2 are put under a mechanical pressure via the end plates 3 and 4 and held together, for example by means of screws or fastening bolts (not shown).

The end plate 4 comprises a number of ports 8 through which liquid and/or gaseous media can be supplied to the electrochemical system 1 and/or through which liquid and/or gaseous media can be discharged from the electrochemical system 1. For example, a fuel (e.g., hydrogen), a reaction gas (e.g., oxygen), and a coolant for cooling the system 1 can be supplied through the ports 8 to the system 1. Additionally, reaction products, such as water and oxygen-depleted air, and the heated coolant can be discharged from the system 1 through the ports 8.

Figure 2:
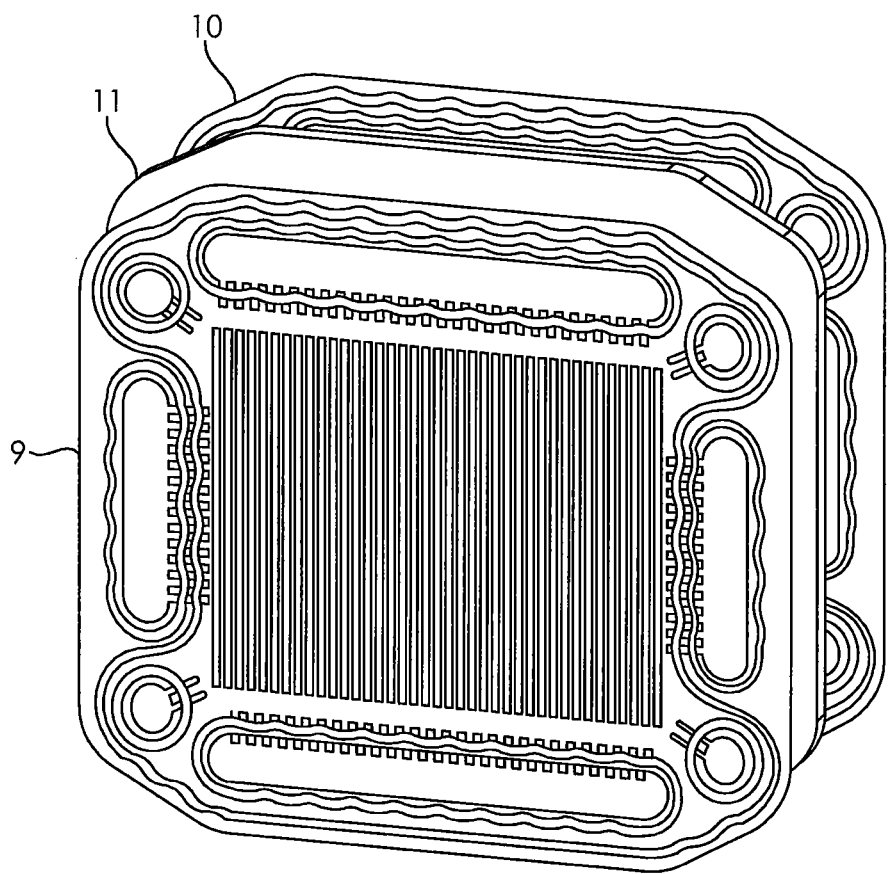
FIG. 2 an electrochemical cell with two metallic bipolar plates.

FIG. 2 shows two adjacent bipolar plates 9 and 10 of the stack 2 of FIG. 1. Here and below, recurring features are designated by identical reference signs. Between the bipolar plates 9, 10, a membrane electrode assembly 11 is arranged, which is part of an electrochemical cell that is bordered by the bipolar plates 9, 10.

Figure 3:
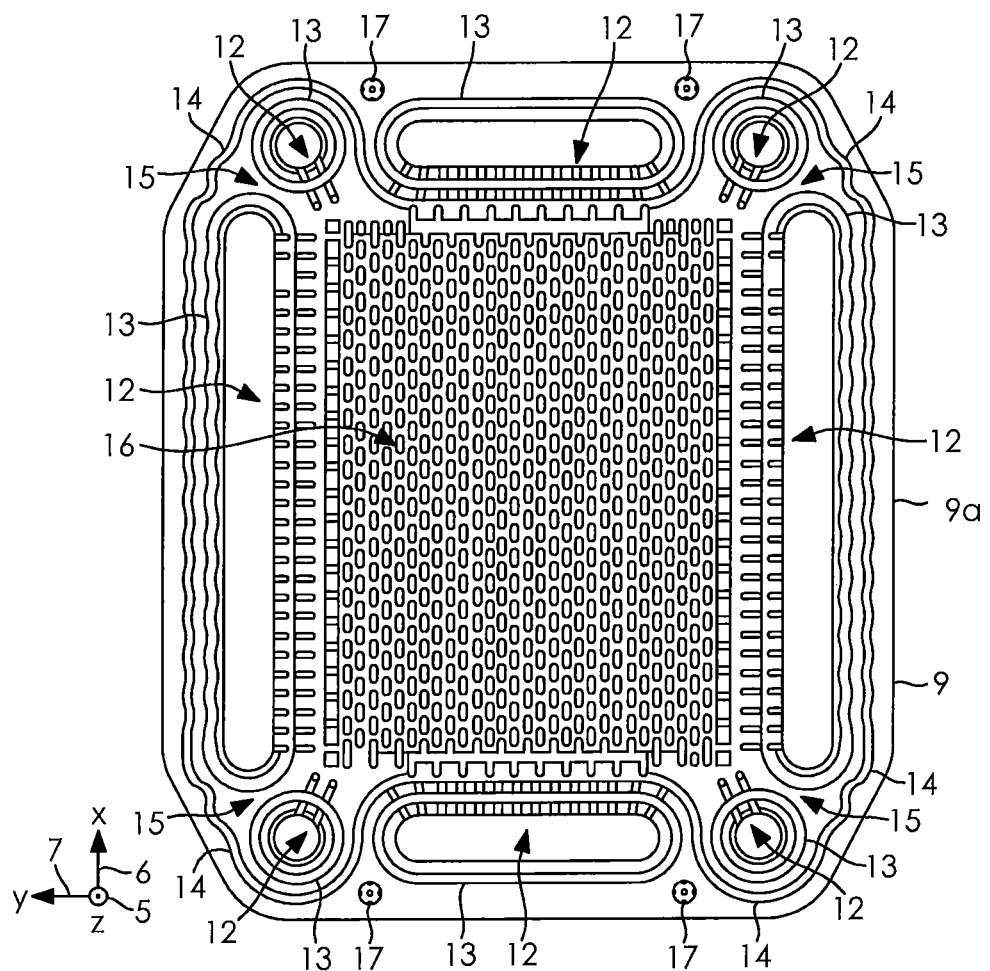
FIG. 3 a plan view of a metallic bipolar plate according to the invention.

FIG. 3 shows the metallic bipolar plate 9 of the stack 2 of FIG. 2, which is oriented parallel to the X-Y-plane, in a plan view. The bipolar plate 9 comprises two individual plates 9a and 9b welded to each other in regions; in FIG. 3 only the first individual plate 9a, which obscures the second individual plate 9b, is shown. The individual plates 9a, 9b are made of stainless steel and have a thickness D defined orthogonally to the main plane of the plates, thus along the Z-direction 5, of e.g. 75 μm or of 100 μm.

The bipolar plate comprises openings 12 that align with corresponding openings in the other bipolar plates of the stack 2 of FIG. 1 and form conduits for conducting media in the stack direction. In order to seal the openings 12 and to form said conduits, the openings 12 are each enclosed by sealing arrangements 13. The sealing arrangements 13 may be formed, for example, as sealing beads and/or as sealing welds. The conduits that are formed in this manner are, for example, in fluid communication with the ports 8 of the end plate 4 of FIG. 1.

The partial plate 9a, shown in FIG. 3, of the bipolar plate 9 moreover comprises a further sealing arrangement 14 adapted for sealing a region 15 that is completely enclosed by the sealing arrangement 14 from the environment of the system 1. The sealing arrangement 14, too, may be formed as a sealing bead and/or sealing weld. In a central rectangular subarea 16 of the region 15 the partial plate 9a comprises a plurality of elevations that protrude orthogonally from the plane of the plate. The subarea 16 between the adjacent bipolar plates 9 and 10 of the stack 2 represents the electrochemically active region for converting chemical energy to electrical energy. Here, the cell is a fuel cell. The channels formed between the elevations of the subarea 16 serve to direct a supply of fuel or of reaction gas to the electrochemically active region 16 of the electrochemical cell.

Outside the region 15 enclosed by the sealing arrangement 14, the individual plate 9a comprises four measuring structures 17. In this case, the measuring structures 17 are formed to be identical. The measuring structures 17 are arranged at or on the individual plate 9a so as to form a rectangle. With an appropriate measuring apparatus, the positions of the measuring structures can be determined and used to establish a coordinate system that is fixedly oriented relative to the individual plate 9a or the bipolar plate 9. Said coordinate system can then help in measuring the individual plate 9a or the bipolar plate 9. By means of said coordinate system, positions or arrangements of structures present in the individual plate 9a, relative to each other or relative to the individual plate 9a, can for example be determined. Said structures may be, for example, channel structures stamped into the individual plate 9a, the sealing arrangements 13, 14, the openings 12, or the outer edges of the plate 9a or of the bipolar plate 9.

The individual plate 9a or the bipolar plate 9 may of course also comprise a greater or smaller number of measuring structures 17. It is likewise conceivable that in alternative embodiments some or all of the measuring structures 17 are arranged inside the region 15, enclosed by the sealing arrangement 14, of the individual plate 9a. They too are then expediently enclosed by analogous sealing arrangements in order to seal them from the region 15, for example by sealing beads or sealing welds.

In FIGS. 4 to 9, possible embodiments of the measuring structures 17 shown in FIG. 3 are shown with the window 18 already open.

Figure 4:
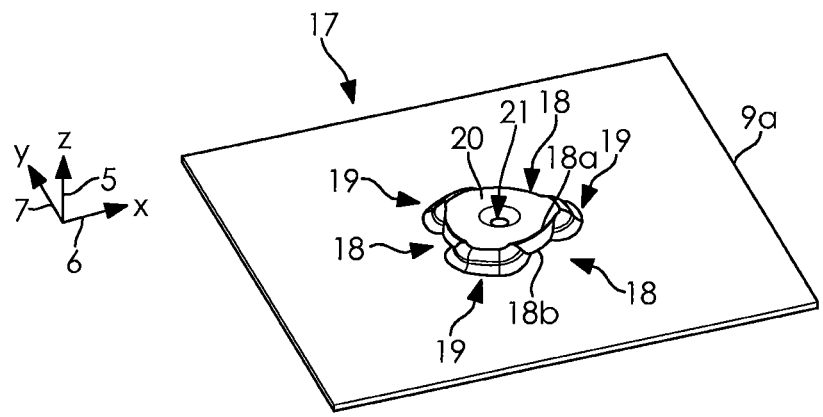
FIGS. 4 to 7 oblique views of a measuring structure of metallic bipolar plates according to the invention.

The measuring structure 17 according to FIG. 4 is formed in one piece with the stainless steel individual plate 9a and produced by a combined cutting and stamping process. The measuring structure 17 according to FIG. 4 comprises a central region 20 elevated and spaced apart from the main plane of the individual plate 9a along the Z-direction 5 and connected via three webs 19 to the main plane of the individual plate 9a. The main plane of the individual plate 9a is oriented parallel to the X-Y-plane. Between each pair of adjacent webs 19, a window 18 is formed in the plate 9a. The measuring structure 17 thus comprises three webs 19 and three windows 18. The windows 18 are delimited by cut edges 18a, 18b in the plate 9a. Merely for the sake of clarity, the cut edges 18a, 18b are explicitly highlighted for only one of the windows 18 in FIG. 4. The edges 18a delimit the windows 18 toward the elevated region 20. The edges 18b delimit the windows 18 toward the main plane of the individual plate 9a and toward the adjacent webs 19.

The elevated region 20 represents a first deformation of the individual plate 9a in the positive Z-direction 5, i.e., orthogonal to the main plane of the individual plate 9a. In order to form the windows 18, the webs 19 and the elevated region 20, the cuts are first made with cut edges 18a, 18b on both sides, for example with a cutting geometry of the combined cutting/stamping tool. It is crucial that no material is removed from the plate 9a by making the cut edges 18a, 18b to form the windows 18. In this manner, forming the measuring structure 17 may be performed in a cutting/stamping tool without producing additional punching slugs.

In the example of FIG. 4, the outer cut edges 18b of all windows 18 are situated on a circle enclosing the elevated region 20. The three cut edges 18b thus form arcs of a circle each extending over a certain angle. If one looks at each of the sections of the cut edges 18b delimiting the adjacent webs 19, their extending on a ring segment holds true at least if they are projected on the main plane of the plate 9a. In order to form the webs 19, the circle is not cut in between two adjacent cut edges 18b. Thus, the three webs 19 and the three cut edges 18b are arranged symmetrically with respect to the circle center and have a 3-fold symmetry. Thus, the arrangement comprising the cut edges 18b and the webs 19 arranged between the cut edges 18b can be made to coincide with itself through rotation around the circle center, here, for example, through rotation by 120 degrees. The cut edges 18b here each have a length of about 0.8 mm. The elevated region 20, which is approximately circular, thus has an area F, determined parallel to the main plane of the plate 9a, of about 2 mm².

In alternative embodiments, the elevated region 20 may also take, for example, the form of an ellipsis or of a regular polygon, preferably a regular polygon with an even number of sides. If the cuts having the cut edges 18a and 18b are made along every other edge of the polygon, the measuring structure 17 will comprise, in the case of a regular polygon with an even number of edges, an equal number of webs and windows.

The process of constructing the measuring structure is illustrated in FIG. 11 in four sub-illustrations 11-a to 11d. The representation is here limited to the region of a plate in which the measuring structure is formed.

In FIG. 11-a, merely the placing of the stainless steel plate about to be shaped into the individual plate 9a between the upper part 50 and the lower part 55 of the tool is shown.

In FIG. 11-b, the upper part 50 and the lower part 55 of the tool have converged to a point where the corners of their sharp edges 50a and 55a rest on a surface of the plate 9a but do not deform it yet. In the other two highlighted regions 50b/55b and 50c/55c, respectively, either both the upper part 50 of the tool and the lower part 55 of the tool or at least the lower part 55 of the tool are spaced apart from the plate 9a.

In FIG. 11-c, the two tool parts 50 and 55 have converged even further. Through this, a cut 28 has been produced by the tool edges 50a and 55a. Also in the right-hand region of the section shown, a change can be seen compared to FIG. 11-b: the plate has been deformed by the upper part of the tool in the region 50c toward section 55c of the lower part of the tool, creating a slanting section 27 that will form a web 19 in the finished measuring structure (see FIG. 4). The region bordering the slanting section 27 in the direction of the cut edge 18a already constitutes a precursor of the first deformation.

Additionally to making the three cuts, each having cut edges 18a, 18b, a deforming force is exerted by the same tool stroke in the positive Z-direction 5 on the individual plate 9a to form the elevated region 20, for example by means of a further stamp 50 of the combined cutting/stamping tool that is shaped correspondingly and points in the positive Z-direction 5. In the regions between two adjacent cut edges 18a, 18b—see FIG. 4—that are not cut, the material of the plate 9a is thus stretched mainly along the Z-direction 5. This stretching produces the webs 19, which connect the elevated region 20 with the main plane of the plate 9a. Together with the webs 19 and the elevated region 20, the three windows 18 are formed by the stamping process; however, in the half-finished state as represented in FIG. 11-c they point exclusively in the Z-direction and thus do not allow light to pass through in the Z-direction.

FIG. 11-d illustrates the further progress of the shaping process. On the one hand, the two cut edges 18a, 18b of the cut 28 have been moved away from one another in the closing direction of the tool, thus enlarging the opening of the window in the Z-direction relative to the state shown in FIG. 11-c. In the right-hand section of the region shown, the slanted section 27 has been enlarged compared to the state shown in FIG. 11-c and thus constitutes a web 19 that almost has its finished shape.

In the central region of the section shown, the stamp 50b has begun to shape a second deformation 21 in the plate 9a. While the cut edge 18a of the window 18 is freely movable between the tool parts 50 and 55 in the plane of the plate, movement of the slanted section 27 is strongly restricted by the tool sections 50c and 55c. This results in further material being pulled especially from the direction of the cut edge 18a when the second deformation is shaped; through this, the cut edges 18a and 18b move away from one another also in the Z-direction, i.e., in the plane of the plate, thus causing opening of the window 18 also in the plane of the plate. Only after this part of the window has been formed, light will be able to pass in the Z-direction.

Since the sharp edges of the sections 50a and 55a of the combined cutting/stamping tool are subject to heavy wear, it may be advantageous to design the tool to be modular so that it is possible to replace individual elements, particularly those which are subject to particular stress.

In the elevated region 20 delimited and enclosed by the windows 18 or the edges 18a and by the webs 19, the measuring structure 17 also in FIG. 4 exhibits the second deformation 21 explained in the context of FIG. 11-d. Said second deformation 21 is a deformation of the plate 9a orthogonal to the main plane of the plate 9a. In FIG. 4, the second deformation 21 is a deformation of the plate 9a in the negative Z-direction 5. The second deformation 21 here forms an approximately circular indentation in the elevated region 20.

The second deformation 21 is spaced apart at least minimally from the cut edges 18a and thus from the edges of the elevated region 20 and from the window 18.

In the example of FIG. 4, a maximal height H of the elevated region 20 over the main plane of the plate 9a, determined along the Z-direction 5, is about 300 µm. Thus, the maximal height H of the elevated region is about three times the thickness D of the plate 9a in this example.

The individual plate 9b joined to the plate 9a may comprise holes 22b for the measuring structures in the regions where the measuring structures 17 of the first individual plate 9a are arranged; conversely, an individual plate 9a may also comprise holes 22a in the regions where the individual plate 9b joined to it comprises measuring structures 17. This is indicated in FIG. 10. Said holes 22a, 22b may be formed, for example, in the shape of through-holes in the respective plate 9a, 9b or in the shape of lateral indentations at the edges of the respective plate 9a, 9b. In this manner, light falling on the plate 9a (9b) and on the bipolar plate 9 orthogonally to the main plane of the plate 9a (9b) or of the bipolar plate 9 can pass through the windows 18 of the measuring structures 17 of the first plate 9a (of the second plate 9b) and through the holes in the second plate 9b (the first plate 9a), which leave the measuring structures 17 visible, and thus through the bipolar plate 9, so that the optical localization of the measuring structures 17 may be performed by using the transmitted-light method.

A measuring apparatus as shown in FIG. 10 for localizing the measuring structures 17 of the plate 9a by the transmitted-light method comprises for example, apart from the bipolar plate 9, a white-light source 91 and a camera 92, the white-light source 91 and the camera 92 being arranged on separate sides of the bipolar plate 9 so that the white-light source 91 and the camera 92 are separated by the bipolar plate 9. The white-light source 91 is preferably adapted to emit light orthogonally or essentially orthogonally to the main plane of the bipolar plate 9 so that the, light emitted by the white-light source can pass through the windows 18 of the measuring structures 17 of an individual plate—in the left-hand edge region of the individual plate 9a and in the right-hand edge region of the individual plate 9b, respectively—and through the holes 22, which leave the measuring structures 17, of the respective other individual plate—9b on the left-hand side and 9a on the right-hand side—visible through the bipolar plate 9. On the opposite side of the bipolar plate 9, the camera 92 is then arranged in such a manner that it is able to detect the light 93 emitted by the white-light source 91 and passing through the bipolar plate 9.

At the sharp cut edges 18a, 18b of the windows 18, a strong optical contrast is produced in the camera image. In this manner, the positions of the center points of the measuring structures 17 can be determined with great precision based on the image data captured by the camera 92, for example by means of known pattern recognition methods. The symmetry of the windows of the measuring structure 17 relative to one another here additionally facilitates determination of the center point position of the measuring structures of the respective plate.

FIGS. 5 to 9 show alternative embodiments of the measuring structure 17 explained with reference to FIG. 4. As before, recurring features are designated by identical reference signs.

Figure 5:
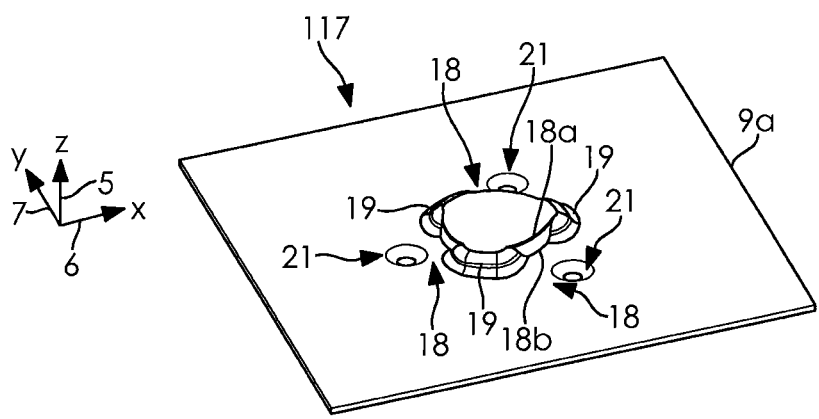

The measuring structure 117 of FIG. 5 differs from the measuring structure 17 of FIG. 4 primarily with regard to the second deformation 21. In contrast to the measuring structure 17 according to FIG. 4, three second deformations 21 are provided in the measuring structure 117 according to FIG. 5, each formed outside the elevated region 20 formed by the first deformation. Each of the three deformations 21 according to FIG. 5 is formed adjacent to one of the windows 18 in the main plane of the plate 9a. The second deformations 21 are again formed as circular indentations. The second deformations are each spaced apart from the cut edges 18b of the windows 18. Through the second deformations 21, the cut edges 18b are each deformed toward the second deformation 21 so that the windows 18, as in the case of the measuring structure 17 according to FIG. 4, allow light falling on the plate 9a orthogonally to the main plane of the plate 9a to pass through. Here, not the cut edges 18b but all of the cut edges 18a lie within a common closed circular curve because the second deformation has been produced adjacent to the cut edges 18b. The situation is similar for the measuring structure embodiments of FIGS. 6 to 9.

The measuring structure 217 according to FIG. 6 again differs from the measuring structure 117 according to FIG. 5 only with regard to the second deformation 21. Here, the second deformation 21 is formed as an annular ditch formed in the main plane of the plate 9a and completely enclosing the elevated region 20, the windows 18, and the webs 19. The annular second deformation 21 and the circular elevated region 20 are arranged concentrically. Just as in the case of the measuring structure 117 according to FIG. 5, this embodiment of the second deformation 21 in the measuring structure 217 according to FIG. 6 causes the cut edges 18b to be deformed toward the second deformation 21, thus, outward from the center point of the measuring structure 217, so that the windows 18 allow light falling orthogonally on the main plane of plate 9 to pass through.

Figure 6:
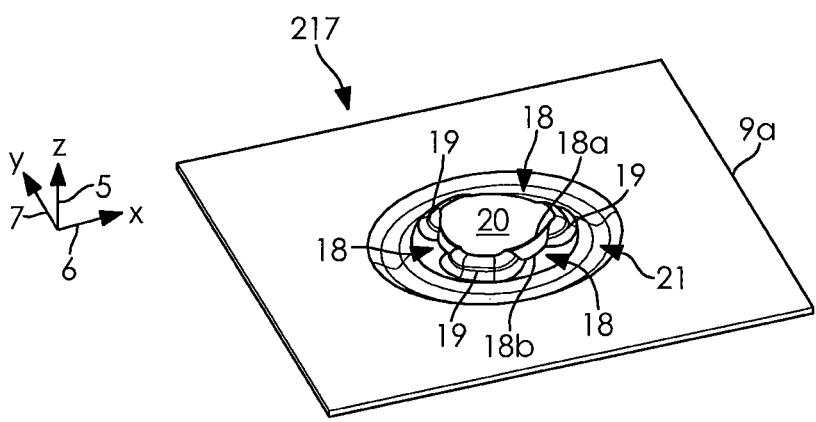
Figure 7:
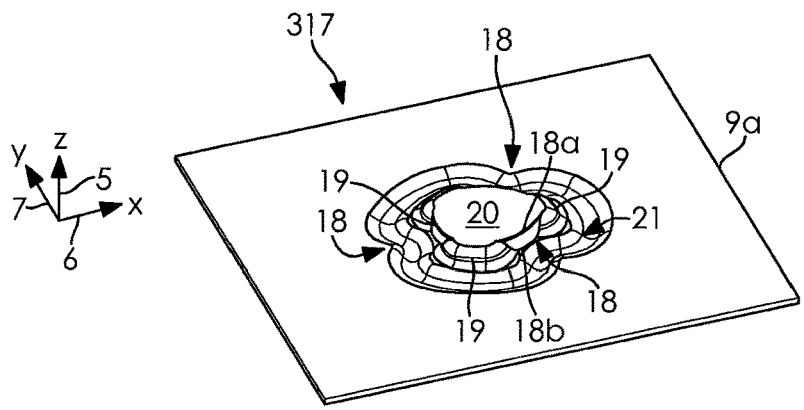

The measuring structure 317 according to FIG. 7 differs from the measuring structure 217 according to FIG. 6 solely in that the second deformation is not formed as an annular ditch, but is disposed closer to each of the windows 18. This causes a stronger deformation of the cut edges 18a toward the second deformation than in the case of the measuring structure 217 with annular ditch according to FIG. 6.

Figure 8:
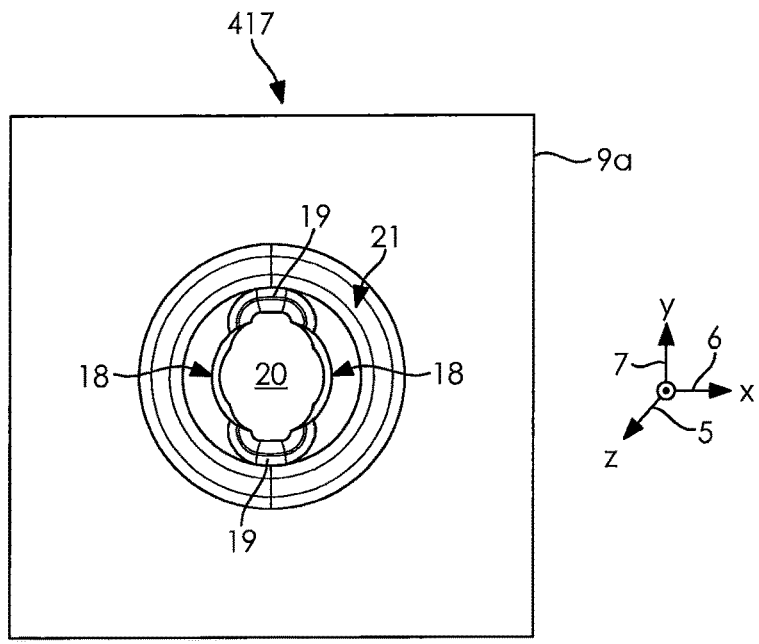
FIG. 8 a plan view of a measuring structure of a metallic bipolar plate according to the invention.
Figure 9:
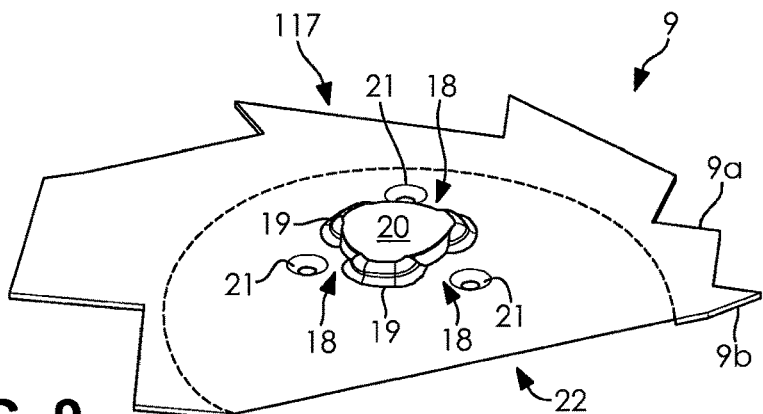
FIG. 9 an oblique view of the measuring structure of a metallic bipolar plate according to the invention.

The measuring structure 417 according to FIG. 8 differs from the measuring structure 217 according to FIG. 6 solely in that the elevated portion 20 is connected to the main plane of the plate 9a only via two opposite webs 19 and in that only two windows 18 are provided, which are opposite to each other. In the plan view of FIG. 8 the projection of the windows 18 on the main plane of the plate 9, which is oriented parallel to the X-Y-plane, is highlighted in black. In the embodiment shown, the first deformation points in the positive Z-direction, and the second deformation points in the negative Z-direction. In alternative embodiments it is, however, also conceivable that the second deformation is formed as an indentation of the elevated region 20 that equally points in the positive Z-direction 5. In that case, the plate 9a would be deformed in the same direction, orthogonal to the main plane of the plate 9a, both in the region of the first deformation and in the region of the second deformation.

For illustration of further ways to design the measuring structure, the reader is additionally directed to FIG. 3, where the four measuring structures 17 each comprise four webs and four windows.

FIG. 9 again shows the measuring structure 117 according to FIG. 5 but additionally also shows the second individual plate 9b. A hole 22 in the second individual plate 9b in the region of the measuring structure 117 of the first individual plate 9a is clearly visible. Light falling orthogonally on the main plane of the bipolar plate 9 comprising the plates 9a, 9b thus can pass through the windows 18 of the measuring structure 117 and through the hole 22.

The invention claimed is:

1. A metallic plate for an electrochemical system, wherein the plate comprises at least one measuring structure formed integrally with the plate, wherein the measuring structure comprises at least two cuts through the plate resulting in cut edges and a first deformation of the plate arranged between the cuts and delimited in sections by the cuts, the cut edges being spaced apart from one another in sections by the first deformation, so that the cut edges of the cuts form at least two windows in the plate, and wherein the measuring structure comprises at least a second deformation of the plate, wherein the plate is deformed by the second deformation in the region of the plate adjacent to the windows in such a manner that the windows allow light that falls on the plate orthogonally to the main plane of the plate to pass through.

2. The metallic plate of claim 1, wherein the first deformation forms a region that is elevated relative to the main plane of the plate.

3. The metallic plate of claim 2, wherein the second deformation is formed within the elevated region formed by the first deformation.

4. The metallic plate of claim 2, wherein the second deformation is formed outside the elevated region formed by the first deformation.

5. The metallic plate of claim 2, wherein the following holds for an area F of the elevated region: $0.5\ mm^2 \leq F \leq 50\ mm^2$.

6. The metallic plate of claim 2, wherein for a maximal height H of the elevated region, the maximal height H being determined along a first direction orthogonal to the main plane of the plate and being determined from the level of the main plane of the plate, the following holds: $100\ \mu m \leq H \leq 700\ \mu m$.

7. The metallic plate of claim 1, wherein the second deformation is spaced apart from the windows.

8. The metallic plate of claim 1, wherein the second deformation of the plate forms a curve enclosing the first deformation, said curve comprising the shape of a ditch forming a closed loop.

9. The metallic plate of claim 1, wherein the plate is deformed by the first deformation in a first direction that is orthogonal to the main plane of the plate and that the plate is deformed by the second deformation in a direction that is orthogonal to the main plane of the plate and opposite to the first direction.

10. The metallic plate of claim 1, wherein the inner cut edges of the plate delimiting the windows from the first deformation or the outer cut edges of the plate delimiting the windows from the main plane of the plate are arranged in such a manner that they form sections of a closed curve in the main plane of the plate, wherein the closed curve comprises a circle, an ellipsis, or a regular polygon.

11. The metallic plate of claim 1, wherein the plate has a thickness D determined orthogonally to the main plane of the plate, wherein $50\ \mu m \leq D \leq 150\ \mu m$.

12. The metallic plate of claim 1, wherein the cut edges have a length L, wherein $0.2\ mm \leq L \leq 10\ mm$.

13. The metallic plate of claim 1, wherein a projection of each of the windows onto the main plane of the plate has an area A, wherein $0.01\ mm^2 \leq A \leq 5\ mm^2$.

14. The metallic plate of claim 1, wherein the plate is made of stainless steel.

15. The metallic plate of claim 1, wherein the plate comprises a sealing weld that forms a closed curve, wherein the measuring structure is arranged outside the closed curve formed by the sealing weld.

16. The metallic plate of claim 1, having four measuring structures that are arranged at or on the plate in such a manner that they form the corners of a rectangle.

17. The metallic plate of claim 1, further comprising a second metallic plate joined to the metallic plate, wherein the second metallic plate comprises at least one through-hole, or an indentation of the outer edge of the second metallic plate, and wherein the edges of the through-hole or of the indentation are offset outwardly relative to the edges of the windows of the measuring structure of the metallic plate so that the metallic plate and the second metallic plate allow light falling on them orthogonally to the main plane of the metallic plate and the second metallic plate to pass through in the region of the windows.

18. The metallic plate of claim 1, further comprising:
a light source; and
an optical detector;
wherein the light source and the optical detector are arranged on opposite sides of the plate and separated by the plate; and
wherein the optical detector is adapted to detect light emitted by the light source and passing through the plate via the windows of the measuring structure.

19. A method of manufacturing a metallic plate, comprising the following steps:
making at least two cuts through the metallic plate;
forming a first deformation of the metallic plate between the cuts through the plate, wherein the cuts are made through the plate and the first deformation is formed in such a manner that the first deformation is delimited at least in regions by the cuts or by the cut edges of the cuts, and that the cut edges of one cut together form one window in the plate; and
forming at least a second deformation of the metallic plate in the region of the plate adjacent to the windows or in regions of the plate adjacent to the windows, wherein the second deformation is formed in such a manner that the plate is deformed in the region adjacent to the window or in the regions adjacent to the windows in such a way that the windows allow light falling on the plate orthogonally to the main plane of the plate to pass through.

20. The method according to claim 19, wherein the first deformation is formed in such a manner that a region that is elevated relative to the main plane of the plate is formed by the first deformation.

21. The method according to claim 20, wherein the second deformation is formed within the elevated region formed by the first deformation.

22. The method according to claim 20, wherein the second deformation is formed outside the elevated region formed by the first deformation.

23. The method according to claim 19, wherein the first deformation is formed in such a manner that the plate is deformed by the first deformation in a first direction that is orthogonal to the main plane of the plate, and wherein the second deformation is formed in such a manner that the plate is deformed by the second deformation in a second direction that is orthogonal to the main plane of the plate and opposite to the first direction.

24. The method according to claim 19, wherein the cuts are made in the plate and the windows are formed in such a manner that the inner cut edges of the plate delimiting the windows from the first deformation or the outer cut edges of the plate delimiting the windows from the main plane of the plate are arranged in such a manner that they form sections of a closed curve in the main plane of the plate.

25. The method according to claim 19, wherein a sealing weld and/or a sealing bead forming a closed curve is formed at or on the plate, wherein the cuts are made in the plate in such a manner and wherein the deformations are formed in the plate in such a manner that a measuring structure formed by the cuts and the deformations is arranged outside the closed curve formed by the sealing weld and/or the sealing bead.

26. The method according to claim 19, wherein four measuring structures are formed in the plate, and this is done in such a manner that they form the corners of a rectangle.

27. The method according to claim 19, wherein the making of the cuts and the forming of the first and/or the second deformation is performed by a combined cutting/stamping tool.

28. Method of producing a metallic bipolar plate or of producing a separator plate for an electrochemical system, comprising the steps:
making at least two cuts through a first metallic plate;
forming a first deformation of the first metallic plate between the cuts through the first metallic plate, wherein the cuts are made through the first metallic plate and the first deformation is formed in such a manner that the first deformation is delimited at least in regions by the cuts or by the cut edges of the cuts, and that the cut edges of one cut together form one window in the first metallic plate; and
forming at least a second deformation of the first metallic plate in the region of the first metallic plate adjacent to the windows or in regions of the plate adjacent to the windows, wherein the second deformation is formed in such a manner that the first metallic plate is deformed in the region adjacent to the window or in the regions adjacent to the windows in such a way that the windows allow light falling on the plate orthogonally to the main plane of the first metallic plate to pass through;
joining the first metallic plate to a second metallic plate;
making a through-hole in the second metallic plate and/or forming an indentation at the outer edge of the second metallic plate;
wherein the through-hole or the indentation is made in the second metallic plate in such a manner, or is formed in such a manner, and the first and the second plate are joined in such a manner that the edges of the through-hole or of the indentation are offset outwardly relative to the edges of the windows of the measuring structure of the first metallic plate so that the bipolar plate, or separator plate, allows light falling on the bipolar plate or separator plate orthogonally to the main plane of the bipolar plate or separator plate to pass through in the region of the windows of the first metallic plate.

* * * * *